United States Patent [19]

Theobald

[11] Patent Number: 5,510,693
[45] Date of Patent: Apr. 23, 1996

[54] METHOD FOR BATTERY CHARGING

[75] Inventor: David J. Theobald, Algonquin, Ill.

[73] Assignee: Motorola, Inc., Schaumbury, Ill.

[21] Appl. No.: 292,553

[22] Filed: Aug. 18, 1994

Related U.S. Application Data

[63] Continuation of Ser. No. 909,883, Jul. 7, 1992, abandoned.

[51] Int. Cl.$^6$ ............................................. H01M 10/44
[52] U.S. Cl. .............................. 320/24; 320/22; 320/39
[58] Field of Search ................................ 320/5, 31, 32, 320/39, 22, 23, 24

[56] References Cited

U.S. PATENT DOCUMENTS

| | | | |
|---|---|---|---|
| 4,136,310 | 1/1979 | Foster | 320/37 |
| 4,392,101 | 7/1983 | Saar et al. | 320/20 |
| 4,399,396 | 8/1983 | Hase | 307/66 X |
| 4,467,265 | 8/1984 | Hierholzer,Jr. | 320/20 X |
| 4,503,378 | 3/1985 | Jones et al. | 320/20 |
| 4,672,993 | 6/1987 | Crampton | 320/14 |
| 4,684,870 | 8/1987 | George et al. | 320/20 |
| 4,742,289 | 5/1988 | Wahlström | 320/14 |
| 4,742,290 | 5/1988 | Sutphin | 320/21 |
| 4,806,840 | 2/1989 | Alexander et al. | 320/20 |
| 5,130,634 | 7/1992 | Kasai | 320/22 |
| 5,166,623 | 11/1992 | Ganio | 324/427 |
| 5,182,509 | 1/1993 | Simmonds | 320/14 |
| 5,191,277 | 3/1993 | Ishikura et al. | 320/22 |
| 5,317,249 | 5/1994 | Ford | 320/2 |
| 5,325,040 | 6/1994 | Bogut et al. | 320/22 |

Primary Examiner—Peter S. Wong
Assistant Examiner—Robert Dapp
Attorney, Agent, or Firm—Dale B. Halling; Donald C. Kordich

[57] ABSTRACT

The battery charging process of the present invention uses three charging rates. The initial charge rate of C charges the battery (101) until the battery's temperature reaches a certain level (102). The charger then changes to a trickle charge rate of C/8 to finish charging the battery (103). Next, the charger reduces the charging rate to C/40 to maintain the battery's charge (105). The process then monitors the battery's voltage. If the voltage signal has a slope that indicates the battery is being used by an attached device (106), the charging rate is increased to the trickle charge rate to simultaneously power the device and charge the battery.

2 Claims, 1 Drawing Sheet

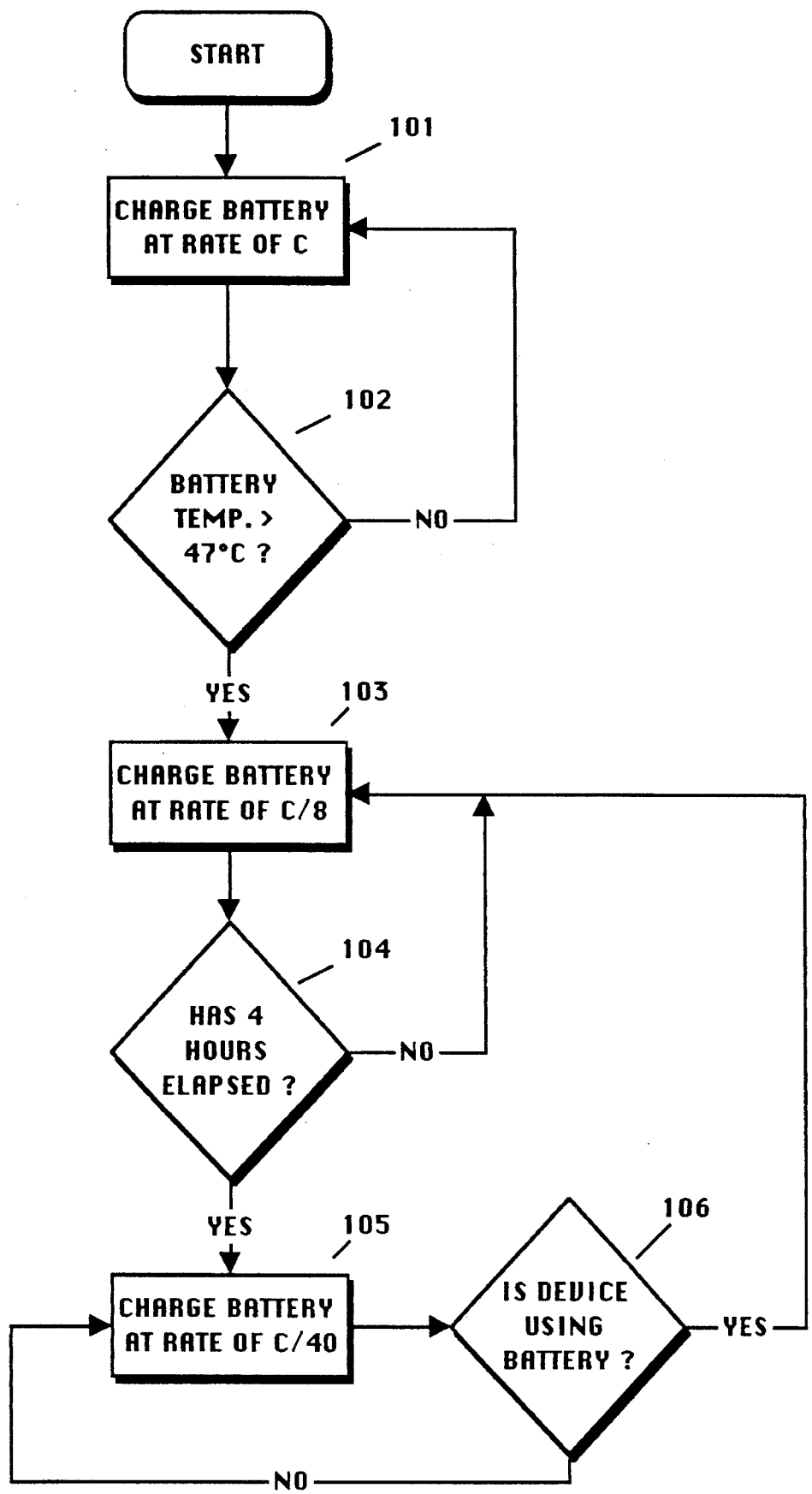

METHOD FOR BATTERY CHARGING

This is a continuation of application Ser. No. 07/909,883, filed Jul. 7, 1992 and now abandoned.

FIELD OF THE INVENTION

The present invention relates generally to the field of battery charging.

BACKGROUND OF THE INVENTION

The increasing use of portable communication devices with newer rechargable batteries has created a need for improved battery chargers. Examples of such communication devices are radiotelephones, radios, and modems. These newer nickel metal hydride (NiMH) batteries require very low, long-term overcharge rates to reduce the likelihood of overcharge damage to the battery. A typical charger charges at a high current rate until the battery is almost charged then reduces the charge rate to a low maintenance charge. This is typically done by monitoring the battery's temperature and reducing the charge rate as the battery temperature increases. When the battery temperature reaches a certain level, the charger changes to the lower, maintenance charge.

In order to eliminate the time that a communication device cannot be used due to charging, newer chargers allow the communication device to be connected to the charger to power the device while it is being used for communicating. This creates a problem if the battery is almost charged and the charger is in the maintenance charge mode. The communication device can require so much current that the charger in the maintenance mode cannot supply all the device's needs and the battery must be used to supply the rest. An example would be a radiotelephone in standby mode using 50 mA while the charger supplies only 25 mA. The radiotelephone user thinks the phone is charging when the battery is actually being drained. There is a resulting need for a process to charge a battery, without damaging the battery, while the device attached to the battery is being used.

SUMMARY OF THE INVENTION

The method of the present invention encompasses a process for charging a battery. The battery charger has a plurality of predetermined charge rates. The process monitors the battery voltage signal. If a slope of the battery voltage signal is greater than a predetermined value, the charging rate is switched from a first predetermined charge rate to a second predetermined charge rate. The second predetermined charge rate has a higher rate of charge than the first predetermined charge rate.

BRIEF DESCRIPTION OF THE DRAWINGS

The FIGURE shows a flowchart of the battery charging process of the present invention.

DETAILED DESCRIPTION OF THE PREFERRED EMBODIMENT

The process of the present invention enables a battery powered device to be used when connected to a charger while still charging the battery at a low, maintenance rate. This process is illustrated in the figure.

The battery charger of the present invention has three charge rates. The fast charge rate is subsequently referred to as C. In the preferred embodiment, 500 mAhr batteries are used, thus making C=500 mA. Alternate embodiments will have different values for C depending on the capacity of the battery being charged.

Referring to the figure, the battery charger monitors the battery temperature as the battery is being charged at the C rate (101). When the battery temperature reaches a predetermined point (102), 47° C. in the preferred embodiment, the charging process changes to a trickle charge mode (103) to finish charging the battery. In the preferred embodiment, this trickle charge rate is C/8. Alternate embodiments can have different trickle charge rates depending on how fast the battery can be trickle charged without damaging or reducing the life of the battery. The trickle charge is continued for a predetermined time (104). In the preferred embodiment, this time is 4 hours.

Once the battery is fully charged, the charging process changes to a maintenance charge mode (105) to keep the battery charged. NiMH batteries typically lose their charge over an extended time, even without use. The maintenance charge mode keeps the battery charged during this period so that a battery user will return to a fully charged battery no matter how long they are away. This maintenance charge rate in the preferred embodiment is C/40.

If the battery is powering a device while in the maintenance charge mode (106), it's likely that the C/40 rate is not providing enough current to power the device and also keep the battery charged to capacity. This may result in the user returning to a discharged battery. The process of the present invention monitors the battery voltage while the battery is being maintenance charged. If the slope of the voltage signal is greater than a predetermined value, indicating the battery is being discharged, the process changes the charge rate back to the trickle charge (103). In the preferred embodiment, the predetermined window is a 0.1 V drop in one hour. This charge rate is maintained for the 4 hours (104). This loop is repeated until the battery is removed from the charger.

In the preferred embodiment, a radiotelephone is connected to the battery while charging. The radiotelephone draws 50 mA while operating in the standby mode. In the trickle charge mode, the trickle charge of C/8 minus the radio standby current yields a C/40 charge rate to the battery. This enables the charger to keep the battery charged while the radio is in use and the user will return to a fully charged battery.

Alternate embodiments of the process of the present invention can have different charge rates depending on the current required by the battery powered device. If the device draws more current than 50 mA, the trickle charge is increased to compensate, thus keeping the battery charged while the device is operating.

I claim:

1. A method for charging a battery in a battery charger having at least three charging rates, the method comprising the steps of:

charging the battery at a charge rate having a value of C until the battery temperature reaches a predetermined temperature;

if the predetermined temperature has been reached, charging the battery at a charge rate having a value of C/8 for a predetermined time;

after the predetermined time, charging the battery at a charge rate having a value of C/40;

monitoring a battery voltage signal of the battery;

determining a slope of the battery voltage signal; and if the drop in slope of the battery voltage signal is greater than a predetermined value, charging the battery at the charge rate having a value of C/8 for the predetermined time.

2. A method for charging a battery in a battery charger having at least three charging rates, the method comprising the steps of:

charging the battery at a fast charge rate until the battery temperature reaches a predetermined temperature;

if the predetermined temperature has been reached, charging the battery at a trickle charge rate, less than the fast charge rate, for a predetermined time;

after the predetermined time, charging the battery at a maintenance charge rate, less than the trickle charge rate;

monitoring a battery voltage signal of the battery;

determining a slope of the battery voltage signal; and if the drop in slope of the battery voltage signal is greater than a predetermined value, charging the battery at the trickle charge rate for the predetermined time.

* * * * *